METHOD AND ELECTROLYTIC DISPLAY FOR SELECTIVELY DISPLAYING AN IMAGE

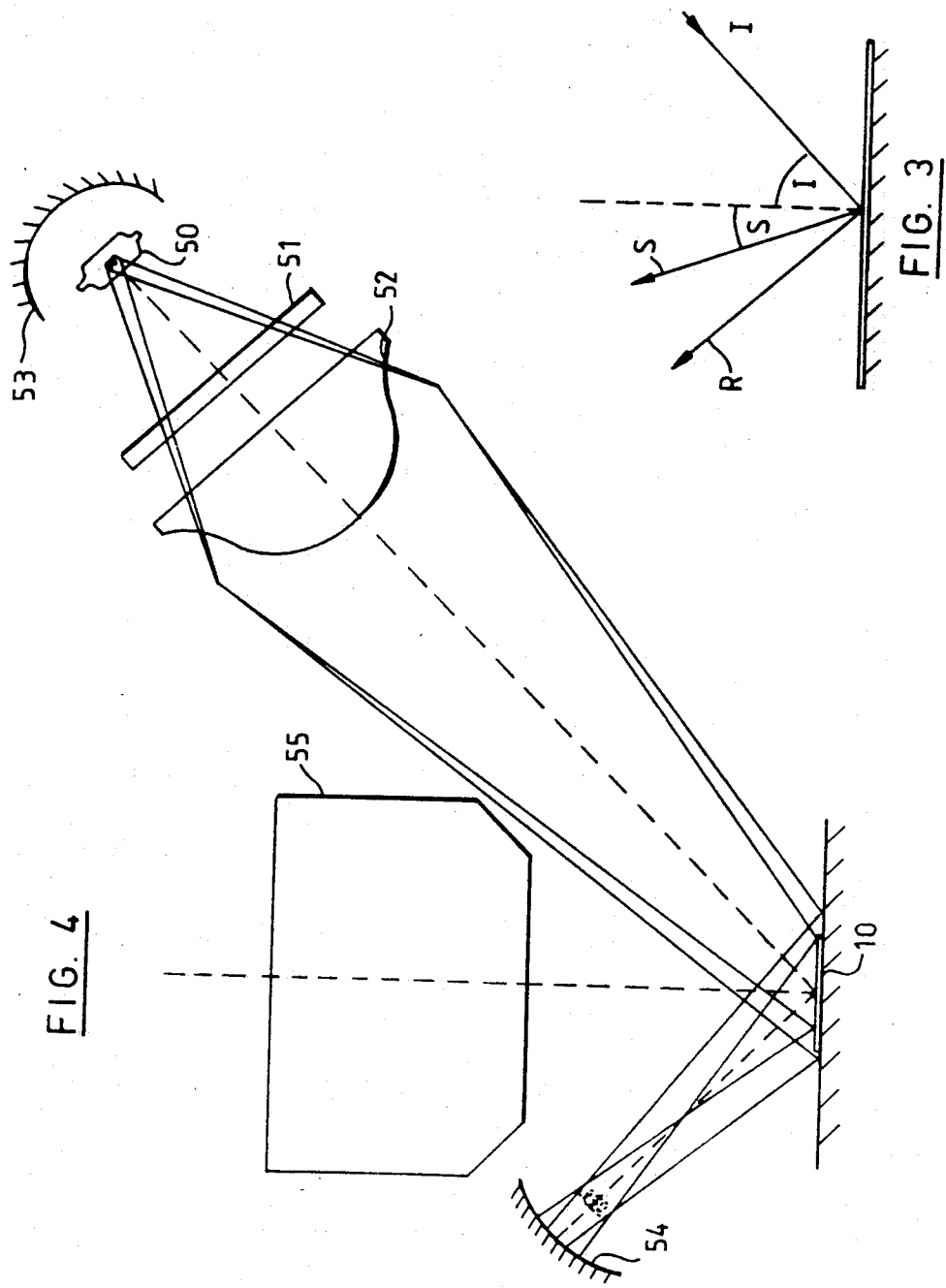

TECHNICAL FIELD OF THE INVENTION

The present invention relates to methods of selectively displaying an image and to electrolytic displays for the same purpose.

BACKGROUND OF THE INVENTION

Electrolytic cells are employed in both liquid crystal and electrochromic displays. In an electrochromic display, the passage of an electric current through the cell to display electrodes causes an electrochromic material present on or near the electrodes to undergo a distinctive colour change.

One well known type of electrochromic display, an early example of which is described in U.K. Pat. No. 1,376,799 (Philips), employs an electrochromic substance in solution which is transparent while dissolved but coloured when electrodeposited upon a display electrode. The coloured and transparent states form a redox pair so that the deposited coloured material can be electrolytically removed by reversing the current direction. Perhaps the best known class of electrochromic substances employed in such displays are the bipyridinium compounds known as "viologens". The di-cations of the viologens such as the 1,1'-di-heptyl-4,4'-bipyridinium di-cation are frequently transparent in solution and can be reduced electrochemically to the radical cation which is violet coloured. In the presence of a suitable anion, such as bromide, phosphate or phosphate/hypophosphite mixtures, the coloured viologen radical salt precipitates out on the cathode.

Somewhat less well known electrochemical displays, which are not strictly electrochromic, involve deposition of, for example, metal films on transparent electrodes to render these electrodes opaque. Early work in the field is described in an article by J Mantell and S Zaromb (J Electrochem Soc Vol 109, pp992–993, 1962). More recently, a display based on the reversible electroplating of black silver has been described in an article entitled "Electrolytic display" by Duchene et al. (Proceedings of 1978 Biennial Display Research Conference, Cherry Hill, N.J., pp34–37.)

Electrochromic and other electrolytic deposition displays, as discussed above, may be viewed or projected in either transmitted or reflected light. Differential absorption of light between the written and unwritten areas determines the achievable contrast ratio which is an important measure of display performance. The contrast ratio is a function of the absorption coefficient of the material and the thickness of material deposited. The article by Duchene also mentions an anomalous enhancement of absorption attributed to scattering of light by the silver deposit.

In the case of viologen based displays employing white silver electrodes, it has proved difficult to attain photopic contrast ratios of more than 3:1 with the deposition of thicknesses of viologen equivalent to 2 $mCcm^{-2}$. To deposit a greater thickness encourages the formation of irreversible deposits and, because of the increased writing time, imposes a significant limitation on the performance of a matrix addressed display.

An article entitled "Projection Display with Electrochemically Created Grating Structures" by W B Pennebaker (IBM Technical Disclosure Bulletin Vol 23, No 1, June 1980, p397) describes an alternative diffraction based technique for achieving contrast in electrolytic displays employing either viologen or silver as the colouring material. Individual picture elements ("pels") of an addressable array consist of electrodes which are formed with a grating structure such that deposition of viologen or silver reveals or enhances the grating. Thus, written pels, when illuminated, diffract incident light to a projection system whereas unwritten pels do not. Contrast thus depends purely on the relative intensity of the diffracted order to the background. The contrast improvements offered by such a system are only realised at the expense of a relatively complex grating structure on each pel surface.

To complete the review of the prior art, the contrast producing mechanisms in liquid crystal displays will be considered. Field effect liquid crystal materials rely on the polarization of light by the liquid crystal material in written areas of the display. Field effect displays must be viewed in transmission and require two polarisers. Another type of liquid crystal material relies on dynamic scattering of light by the liquid crystal material and can operate in reflected light. The basic principle of producing contrast in dynamic scattering displays is to illuminate the display from an angle which makes the scattered (diffusely reflected) image visible to the observer while deflecting the specular image out of the field of view. Examples of this technique may be found in U.S. Pat. Nos. 3,947,091 (RCA) and 3,992,081 (Suwa Seikosha).

DISCLOSURE OF THE INVENTION

The prior art electrolytic displays of the kind in which the image is formed by deposition have, in some cases, suffered from marginal contrast ratios especially if high speed repeatable performance is required. The proposed diffraction based alternative, while improving contrast, necessitates the fabrication of complex electrode surface structures.

The present invention is based on previously unrealised and unexploited light scattering properties of electrolytic display deposits. According to the invention there is provided a method of selectively displaying an image on a substantially non-scattering surface comprising the steps of writing the display by reversibly electrodepositing a light scattering deposit on the surface in the desired image configuration, whereby incident light is scattered out of the specular direction by written areas; and forming the image from substantially one only of the specular and non-specular components.

The invention also provides an electrolytic display for selectively displaying an image comprising a plurality of display electrodes having substantially non-scattering surfaces; an electrolyte containing a reversibly depositable material in solution; display writing means for electrically energizing selected electrodes to cause the deposition thereon of said material in the desired image configuration, the deposited material having light scattering properties whereby incident light is scattered out of the specular direction by the deposit on energized electrodes; and an optical system arranged so that the image is formed from substantially one only of the specular and non-specular components.

With such a method and display, contrast ratios are theoretically infinite and in practice, with viologen, contrast ratios of 30:1 have been achieved. Effectively, the specular and non-specular components of the reflected light are separated and only the written areas contribute to the non-specular component. Preferably, the optical system arrangement restricts the emergent light so as to transmit one of the specular and non-specular components.

It is preferred that the non-specular component is the transmitted one. The image so formed is bright in areas corresponding to the written areas and on a dark background. It is also possible to transmit the specular component, in which case the image will be perceived as dark areas on a bright background. However, since there is substantial scattering in as well as away from the specular direction, the contrast ratios achievable are very inferior though they may be improved to some extent by the use of polarisers. The precise angular distribution of the scattered light about the specular direction has not been determined, though a Rayleigh-Mee mechanism has been assumed.

Although specularly reflecting bright electrodes have been employed, it is not necessary, in theory, that the electrodes should be bright but merely that they be substantially non-scattering in their unwritten state. Dark electrodes could conceivably be used to absorb light incident on unwritten areas.

The preferred method of operating the display is to illuminate the surface obliquely and project the image through a lens whose entrance pupil excludes any specularly reflected light. Clearly, the higher the degree of collimation employed, the more complete can be the separation between specular and non-specular components. Nevertheless, directly viewed displays with or without a lens and depending on daylight or room lighting for illumination can be contemplated.

Many ways of illuminating the display are possible, for example: by means of a condenser lens, by means of an optic fibre bundle or by means of a lamp with an appropriately shaped back reflector. Within limits determined by the degree of collimation achievable, it appears to be desirable to collect scattered light as close to the specular directions as possible to achieve maximum brightness. However, practical limitations such as the size and positioning of a projection lens may restrict the transmitted light to components at about 45° to the specular direction.

The scattering effect has been demonstrated with viologen but the invention is not restricted to this single class of substances as it is clear that other electrodeposits such as silver can be made light scattering. The presently preferred viologen is a mixture of 1,1'di-n-heptyl-4,4'bipyridinium phosphate and hypophosphite.

With viologen, it has been found that high contrast ratios up to 30:1 can be achieved with only one quarter the amount of viologen necessary to achieve contrast ratios of 3:1 in an absorption mode.

Specifically a charge density equivalent of 0.5 to 1.0 mCcm$^{-2}$ is preferred. It is also preferred to write the display at a constant current of 0.5 Acm$^{-2}$, giving write times of 1-2 mS. These particular conditions appear to give the best scattering properties.

Gold is the preferred though not the only possible electrode material. Scattering has been demonstrated with other bright metals such as silver and titanium although there have been some difficulties in erasing titanium attributable to the formation of an oxide film.

BRIEF DESCRIPTION OF THE DRAWINGS

FIG. 3 is a ray diagram illustrating the optical principles of a display according to the invention;

FIG. 4 shows an illumination and projection system, according to the principles of FIG. 3, forming the remaining part of the display of FIGS. 1 and 2;

DETAILED DESCRIPTION OF THE INVENTION

Figure 1:
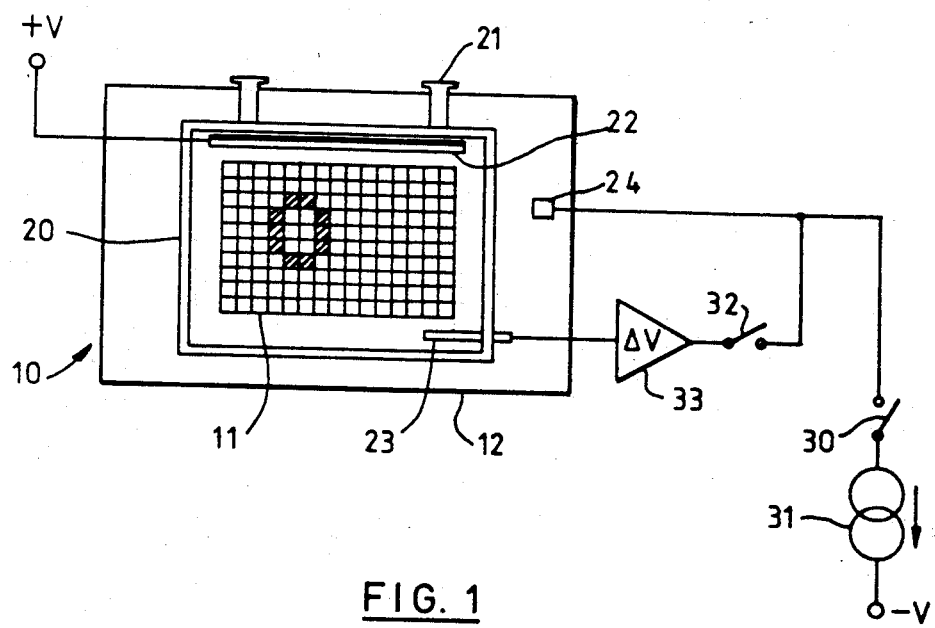
FIG. 1 is a simplified plan view of an electrolytic display cell and an associated schematic drive circuit constituting part of an electrolytic display according to the invention.
Figure 2:
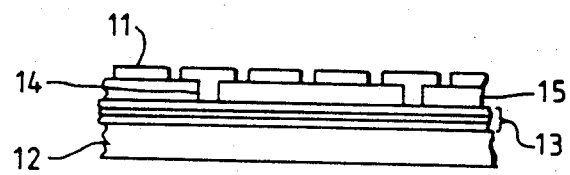
FIG. 2 is a section through a portion of the display cell of FIG. 1.

The electrolytic display cell 10, shown in FIGS. 1 and 2 is an experimental cell capable of displaying only a single fixed format image. It consists of a rectangular array of optically smooth gold electrodes 11 formed on a substrate 12. Only those electrodes 11 which form the fixed format image are electrically connected, the rest being dummies. The number of electrodes shown in FIG. 1 has been reduced, for ease of illustration.

As shown in FIG. 2, connection of these electrodes to a conductive triple layer 13 of chromium/gold/-chromium is by way of via holes 14 opened in a polyimide insulating layer 15. Gold is evaporated over the entire surface of the insulating layer 15 to fill the vias. The array of individual electrodes 11 is produced by masking and etching the evaporated gold surface layer. The surface of electrodes 11 is optically smooth to ensure that it does not scatter light to any appreciable degree. As nearly as possible, the surface should behave as a specular reflector.

Around the array of electrodes 11 is placed a liquid tight frame 20 made of a transparent acrylic material. This is filled through tubes 21 with an electrolyte containing electrodepositable material. In the present example, the material is a mixture of 1,1'di-n-heptyl-4,4'-bipyridinium phosphate and hypophosphite in aqueous solution as described in our published European patent application No. 1912.

Sealed within the cell frame is a counter electrode 22 which is an L section platinum foil strip on which platinum black has been deposited. Also sealed into the cell frame wall and extending within the frame is a reference electrode 23 which is a fine silver rod.

External electrical connection to the common conductor layer 13 is made by way of a window 24 opened in the insulating layer 15.

The cell described is driven by conventional external circuitry in a known manner. To write the cell a switch 30 is closed for a predetermined period of time to connect a constant current source 31 to the working electrode 11. The passage of a predetermined amount of charge results in the reduction of an equivalent amount of viologen to its radical cation state at the connected electrodes 11. The reduced radical cation combines with the anions in solution and precipitates on the electrodes. In the present example less than 1.0 mCcm$^{-2}$ of viologen is deposited which does not form a readily visible deposit when relying on absorption of light for contrast. In FIG. 1, deposition has been indicated on certain electrodes shown dark. This is purely for ease of illustration and, as will be further explained below, should not be taken to represent the actual appearance of the image which is, in fact, light on a dark background.

Once the image has been written, switch 30 is opened. The deposit and image will remain on the cell for upwards of a minute while the cell is in its open circuit "hold" state.

The image is erased by the well known potentiostatic technique. This is effected in the display of FIG. 1 by closing a switch 32 to connect the output of an offset buffer 33, which is a high impendance amplifier, to the common electrodes 11. The input to the amplifier is the solution potential sensed by the referenced electrode 23. The offset, "delta V", of the amplifier is made equal to an erase potential $V_E$ corresponding to that of a bare gold electrode in the solution. Without drawing current from the reference electrode, the buffer amplifier 33 supplies erase current to the electrodes 11 until their potential reaches the output potential $V_E$ with respect to the reference electrode.

As thus far described, the display of FIGS. 1 and 2 is identical to a conventional electrochromic display except that the amount of viologen used to write it is significantly less than that normally required for visibility. However the thin layer of viologen on the written electrodes turns out to be an excellent scatterer of light. This property is exploited, as shown in FIGS. 3 and 4, to enable very much higher contrast ratios to be achieved than are possible relying on absorption alone.

The principle is illustrated in FIG. 3 where an incident light ray, I, is incident on a smooth specularly reflecting electrode surface. If the surface is bare the incident light obeys the law of reflection and a reflected ray R emerges. If however, the surface is modified by the deposition thereon of a light scattering layer, some of the incident light is scattered out of the specular direction, one such scattered ray being shown as S. Clearly, the extent of the scattering will depend on the properties of the surface and of the incident light. In the present case, a Rayleigh-Mee scattering mechanism is assumed.

If light emerging in the specular direction is separated from light emerging in non-specular directions, a light valve has been created. Only electrodes which have been written with a scattering layer will emit light in the non-specular direction. Unwritten electrodes will reflect substantially all the incident light specularly. Consequently if a non-specular beam is selected, written electrodes will appear bright and unwritten ones black. In theory, the contrast ratio is infinite but, in practice, a small amount of light will be scattered by imperfections or irregularities on and around unwritten electrodes, resulting in a certain background brightness.

An optical system employing this effect is shown in FIG. 4. The cell 10 is illuminated by a lamp 50 through an infra-red mirror 51 and aspheric lens 52. The lamp is backed by a reflector 53 which is a so-called cold mirror. The illumination system produces a partly collimated converging beam of light with relatively limited angular divergence which strikes the target 10 obliquely at an angle of about 45 degrees. Specularly reflected rays are reflected towards a retro-reflector 54 which returns this light in the general direction of the target. A proportion of scattered light from the written electrodes is collected by a projection lens assembly 55 and projected onto a screen (not shown). The entrance pupil to the lens optically restricts the emergent light to transmit only the non-specular component for projection. Specularly reflected light falls outside the pupil.

For a viologen equivalent of 0.66 mCcm$^{-2}$, contrast ratios of 24:1 have been obtained. Centre screen brightnesses, at six times magnification, of 390 Cdm$^{-2}$ were achieved under illumination by a 50 W tungsten halogen lamp. The contrast ratio decreased by 15% in 60 seconds. Successful operation was somewhat temperature dependent, the limits being 27°–31° C. Potentiostatic erasure of the display took 100 mS. Up to 30,000 write/hold/erase cycles of the display have been achieved without failure. The cycle employed was:

WRITE: 1.2 mS;
HOLD: 1 S;
ERASE: 100 mS;
HOLD: 1 S.

It was found that a certain amount of background brightness was caused by regularly repeating features of the array, such as the edges of the pels, behaving as a diffraction grating. This was minimised by illuminating the display at 45° to the axes of the array which reduced the background brightness by a factor of four.

Figure 5:
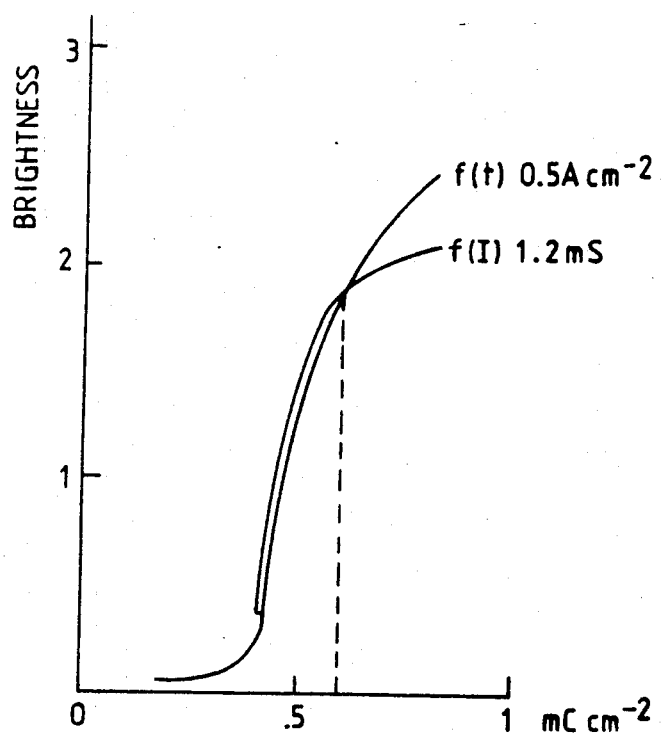
FIG. 5 shows the variation of brightness with charge in a viologen based display such as that of FIGS. 1 to 3.
Figure 6:
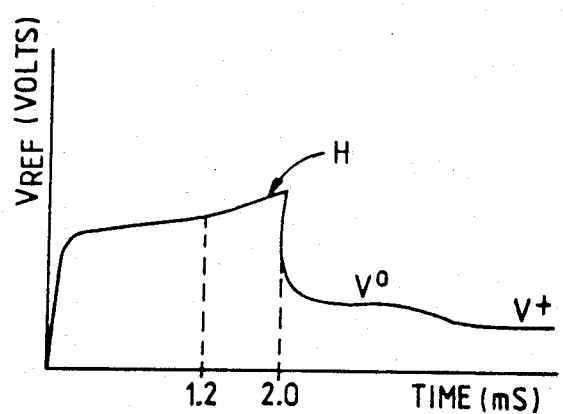
FIG. 6 shows the variation of solution potential with time upon the application of a step current function to a viologen based display such as that of FIGS. 1 and 2.

FIGS. 5 and 6 show various experimental results relating to the scattering of light by viologen electrodeposits which have been used to determine the optimum conditions for operating the display of FIGS. 1, 2 and 4.

FIG. 5 shows the variation of brightness with applied charge for the above described viologen system. The display was illuminated at 45° and the brightness, in arbitrary units, was measured normally to the display by means of a spotmeter. The deposited charge may be varied either as a function of time or as a function of applied current density and curves are shown for both situations. It can be observed that no measurable scattering occurs until about 0.4 mCcm$^{-2}$ of charge has been passed and that the increase in brightness begins to tail off at around 1.0 mCcm$^{-2}$ for the time function and at considerably lower values for the current density function due to the onset of side reactions.

FIG. 6 shows the variation of solution potential as measured by a reference electrode for an applied current having a constant current density of 0.5 Acm$^{-2}$. At times up to about 1.2 mS the potential is such that only the desired $V^{2+} \rightarrow V^{+\cdot}$ reduction is taking place.

At about 1.2 mS, the further reduction $V^{+\cdot} \rightarrow V^{\circ}$ commences and, if the current continues for 2 mS, hydrogen is evolved. At 2 mS, in FIG. 6, the write current pulse ceases and the solution potential falls to the Nernst potential for $V^{\circ}$ and subsequently to the potential of $V^{+\cdot}$.

Figure 7:
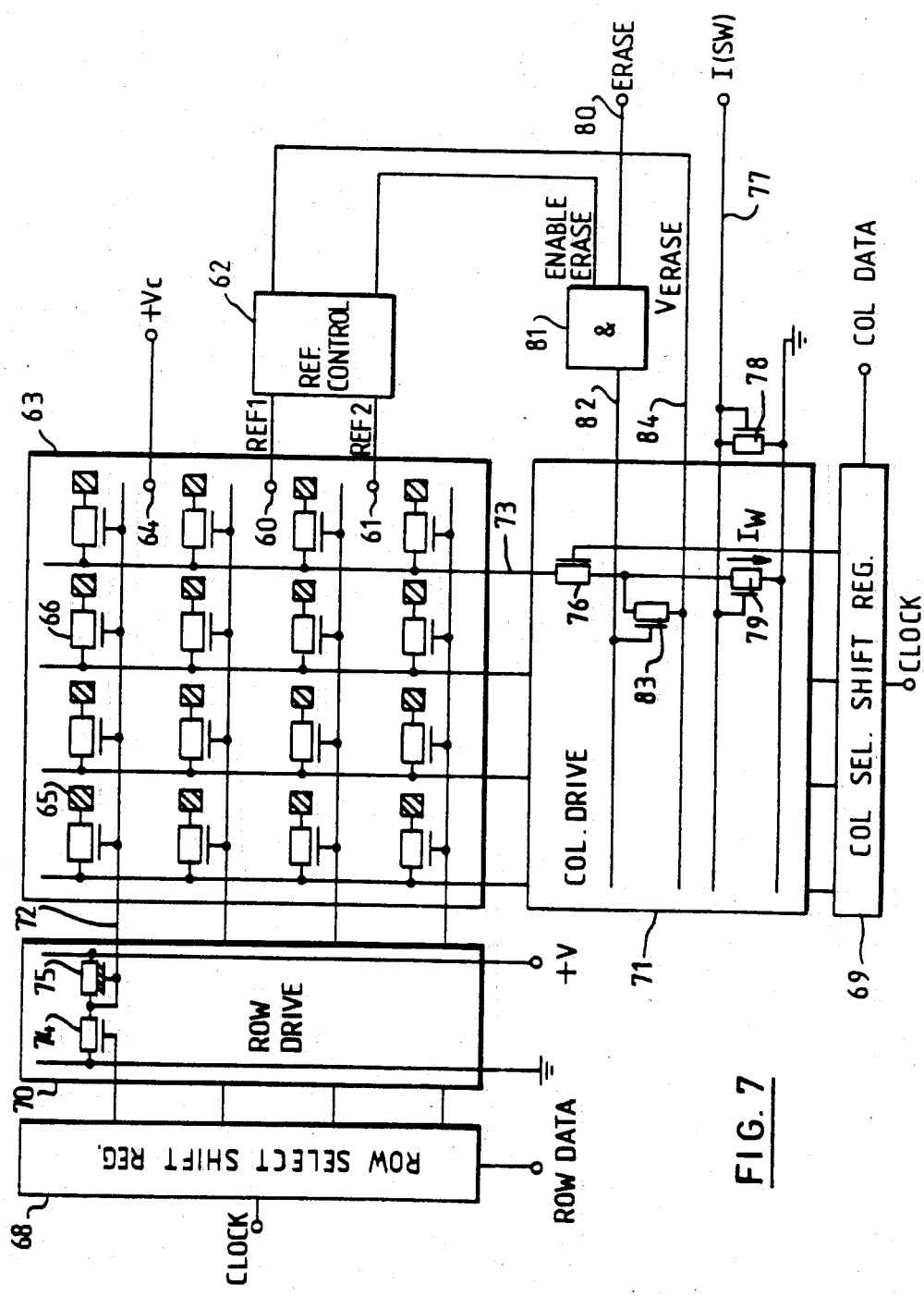
FIG. 7 is a schematic diagram of a selectively addressable matrix display which can be substituted for the display cell of FIG. 1.

The display of FIGS. 1, 2 and 4 is a fixed format display in which only a single image is produced. The invention is, of course, equally applicable to a matrix display in which each element is individually addressable. The principles of operation of such a display are well known and an example is shown in FIG. 7.

The display is similar to that of FIG. 1 in many respects and comprises a sealed cell 63 containing an aqueous solution of a mixture of 1,1'di-heptyl-4,4'-bipyridinium phosphate and hypophosphite. Within the cell are a pair of silver reference electrodes 60 and 61, a platinum black counter electrode 64, connected to a source of potential $V_c$, and an array of identical bright gold display electrodes 65, each constituting one picture element or "pel". For ease of illustration only sixteen pels are shown, arranged in a four by four array. In practice a much larger number would be employed. The reference electrodes 60 and 61 are used alternately under control of a circuit 62 which forms no part of the present invention. Details of the operation of this circuit and the dual reference electrodes can be found in our pending European Patent Application No. 80302183.0.

The pels 65 are formed over a corresponding array of field effect transistors 66 and each pel is electrically connected to the drain of an associated FET 66 by via metallurgy. The FET's are themselves formed on a silicon substrate and overlaid with inorganic and organic passivation layers.

The write and erase operations of the display cell 63 are controlled by associated display drive circuits in response to externally supplied control signals. The write operation is a constant current process and the erase operation is potentiostatic, as described in principle in FIG. 1.

Each of the pels 65 may be individually selected for writing by means of its associated FET 66 which behaves as a switch. The individual pels are identified by means of row and column data loaded into shift registers 68 and 69. The row and column shift registers control associated row and column drivers 70 and 71 which activate selected row and column lines 72 and 73 to the gates and sources respectively of the FET matrix. Thus if a row line 72 is activated, that row of FET's connect the pels 65 of the row to any write or erase currents flowing on column lines 73.

The row drive circuit 70 comprises a string of transistor pairs, such as enhancement mode device 74 and depletion mode device 75, each associated with one stage of the shift register 68. These two devices form a line driving inverter which isolates the shift register circuit from the loading of the row select line.

The column driver 71 is slightly more complicated in that it has to provide both erase and write current to the lines 73. Selection of a line 73 for either operation is by means of a transistor switch 76 in accordance with the contents of an associated shift register stage.

The write operation is selected by switching a reference current $I_{(SW)}$ to the write line 77. Transistor 78 controls the gate voltage of a number of coupled transistors 79 such that they act as current sources of magnitude equal to the reference current, one for each column, equivalent to the source 31 of FIG. 1. Thus, if a selection transistor 76 is on, a constant current, $I_w$, will be drawn from the associated column line 73. The writing process is such that the display is written one row at a time so that only a single FET 66 in any column can be on at any given time.

The potentiostatic erase process is also controlled by the row and column drivers and can be a block operation. In other words all pels, both written and unwritten, in an area to be erased are selected by loading the row select and column select shift registers 68 and 69 with the appropriate data pattern. The erase operation is selected by the application of an externally generated ERASE signal to line 80. If an ENABLE ERASE signal has been generated by control circuit 62 an AND gate 81 raises a line 82 to switch on a string of transistors 83. These transistors, when switched on, connect the potentiostatic erase voltage $V_{ERASE}$ applied on a line 84 to all the selected column lines 73 via transistors 76. The potentiostatic erase voltage is generated from the solution potential sensed by reference electrode 60 by an offset amplifier in reference control circuit 62 similar to amplifier 33 of FIG. 1. Because the potentiostatic erase process is self limiting, no damage results from the selection and connection of unwritten as well as written pels to the erase potential.

Further details of the operation and construction of an addressable display very similar to that shown in FIG. 7 may be found in the specification of our above-referenced European application No. 80302183.0.

The display of FIG. 7 may be substituted for that of FIG. 1 in the system of FIG. 4 to produce a fully variable electrolytic display, operating by the light scattering effect.

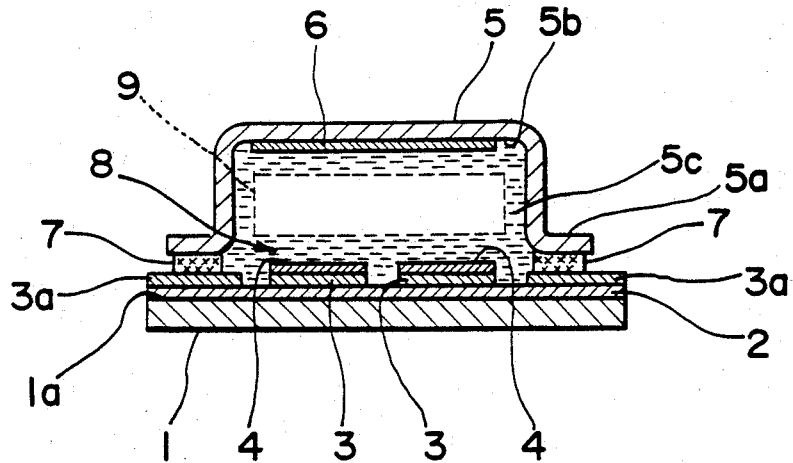

Having thus described our invention, what we claim is new, and desire to secure by Letters Patent is:

1. A method of selectively displaying an image comprising the steps of:
   writing the display by reversibly electrodepositing a light scattering deposit on a substantially non-scattering opaque surface in the desired image configuration, illuminating the display in reflection from a particular direction, whereby incident light is scattered out of the specular direction by written areas; and
   projecting a non-specular component of the emergent light to form the image.

2. A method according to claim 1 including projecting said non-specular component with a lens whose optical axis intersects the surface and illuminating the display obliquely in such a manner that any specularly reflected light from the surface falls outside the entrance pupil of the lens.

3. A method according to claim 2 in which the electro-deposited material is a viologen and in which the step of writing the display comprises depositing between 0.5 and 1.0 $mCcm^{-2}$ equivalent of viologen.

4. A method according to claim 2 in which the step of writing the display further comprises passing a constant current of density substantially equal to 0.5 $mAcm^{-2}$ to the areas of the surface where deposition is required.

5. An electrolytic display for selectively displaying an image comprising:
   a plurality of display electrodes having substantially non-scattering opaque surfaces;
   an electrolyte containing a reversibly depositable material in solution;
   display writing means for electrically energizing selected electrodes to cause the deposition thereon of said material in the desired image configuration; the deposited material having light scattering properties; and
   an optical system comprising:
   illumination means for illuminating the display electrodes in reflection from a particular direction, whereby incident light is scattered out of the specular direction by the deposit on the energized electrodes; and
   projection means for projecting the non-specular component of the emergent light to form the image.

6. A display according to claim 4 in which the surfaces of the electrodes are of bright metal so that incident light is substantially specularly reflected from the electrodes.

7. A display according to claim 5 in which the projection means includes a lens assembly whose optical axis intersects the display area defined by the plurality of electrodes and the illumination means includes a partially collimated light source and is arranged to illuminate the display area obliquely such that any specularly reflected light from the display electrodes falls outside the entrance pupil of said projection lens assembly.

8. A display according to claim 5 in which the material is a viologen and the display electrodes are of gold.

9. A display according to claim 8 in which the material is a mixture of 1,1'di-n-heptyl4,4'bipyridinium phosphate and hypophosphite.

* * * * *

United States Patent [19]

Washo et al.

[11] Patent Number: 4,527,865
[45] Date of Patent: Jul. 9, 1985

[54] ELECTROCHROMIC DISPLAY DEVICE

[75] Inventors: Junichi Washo, Yamatokoriyama; Takaaki Miyazaki, Nara; Mitsuo Ishii, Yamatokoriyama; Muneo Nakayama, Tokyo; Akira Hashimoto, Yokohama; Toshihiro Nishimura, Kawasaki, all of Japan

[73] Assignees: Sharp Kabushiki Kaisha, Osaka; Tokyo Ohka Kogyo Co., Ltd., Kanagawa, both of Japan

[21] Appl. No.: 579,006

[22] Filed: Feb. 15, 1984

Related U.S. Application Data

[63] Continuation of Ser. No. 275,387, Jun. 19, 1981, abandoned.

[30] Foreign Application Priority Data

Jun. 23, 1980 [JP] Japan .................................. 55-85385

[51] Int. Cl.$^3$ .............................................. G02F 1/17
[52] U.S. Cl. .................................... 350/357; 350/336; 350/363
[58] Field of Search ............... 350/357, 336, 353, 355, 350/363; 427/108

[56] References Cited

U.S. PATENT DOCUMENTS 4,238,276 12/1980 Kinugawa et al. .................. 427/108
4,240,713 12/1980 Leibowitz ........................... 350/357

FOREIGN PATENT DOCUMENTS 82442 7/1978 Japan .................................... 427/108

Primary Examiner—James W. Davie
Attorney, Agent, or Firm—Birch, Stewart, Kolasch & Birch

[57] ABSTRACT

An electrochromic display device comprising a transparent substrate and a counter substrate sealingly joined together to define a cell for accommodating an electrolyte, a transparent electroconductive layer on an inner surface of the transparent substrate, a display electrode layer overlaying the transparent electroconductive layer and a counter electrode layer deposited on an inner surface of the counter substrate is featured by the provision of a transparent insulating layer between the transparent substrate and the transparent electroconductive layer.

1 Claim, 1 Drawing Figure